US007304263B2

(12) United States Patent
Chang et al.

(10) Patent No.: US 7,304,263 B2
(45) Date of Patent: Dec. 4, 2007

(54) SYSTEMS AND METHODS UTILIZING AN APERTURE WITH A REACTIVE ATOM PLASMA TORCH

(75) Inventors: Andrew Chang, Oakland, CA (US); Jeffrey W. Carr, Livermore, CA (US); Jude Kelley, Belmont, CA (US); Peter S. Fiske, Oakland, CA (US)

(73) Assignee: RAPT Industries, Inc., Fremont, CA (US)

( * ) Notice: Subject to any disclaimer, the term of this patent is extended or adjusted under 35 U.S.C. 154(b) by 0 days.

(21) Appl. No.: 10/911,821

(22) Filed: Aug. 5, 2004

(65) Prior Publication Data

US 2005/0061782 A1 Mar. 24, 2005

Related U.S. Application Data

(60) Provisional application No. 60/495,176, filed on Aug. 14, 2003.

(51) Int. Cl.
*B23K 9/00* (2006.01)

(52) U.S. Cl. .......................... 219/121.41; 219/121.48; 219/121.59; 156/345.39; 264/1.36; 216/38

(58) Field of Classification Search ........... 219/121.36, 219/121.41, 121.4, 121.48, 121.49, 121.59, 219/121.51; 216/24, 38; 156/345.39, 345.48; 264/1.36, 2.7, 600, 80, 81, 82

See application file for complete search history.

(56) References Cited

U.S. PATENT DOCUMENTS

| | | | | |
|---|---|---|---|---|
| 4,532,199 | A | 7/1985 | Ueno | 430/128 |
| 5,256,205 | A | 10/1993 | Schmitt, III | |
| 5,468,955 | A * | 11/1995 | Chen et al. | 250/251 |
| 5,629,054 | A * | 5/1997 | Kanai | 427/575 |
| 5,683,548 | A | 11/1997 | Hartig | |
| 6,660,177 | B2 * | 12/2003 | Carr | 216/63 |
| 6,663,231 | B2 * | 12/2003 | Lee et al. | 347/68 |

FOREIGN PATENT DOCUMENTS

| | | | |
|---|---|---|---|
| DE | 19925790 | A1 * | 12/2000 |
| DE | WO 02/061171 | A1 | 8/2002 |
| EP | 546 842 | A1 | 6/1993 |

OTHER PUBLICATIONS

International Search Report Mailed Oct. 31, 2005, PCT.

* cited by examiner

*Primary Examiner*—Mark Paschall
(74) *Attorney, Agent, or Firm*—Fliesler Meyer LLP

(57) ABSTRACT

The footprint of a reactive atom plasma processing tool can be modified using an aperture device. A flow of reactive gas can be injected into the center of an annular plasma. An aperture can be positioned relative to the plasma such that the effective footprint of the plasma can be changed without adjusting the gas flows or swapping out the tool. Once the aperture and tool are in position relative to a workpiece, reactive atom plasma processing can be used to modify the surface of the workpiece, such as to etch, smooth, polish, clean, and/or deposit material onto the workpiece. If necessary, a coolant can be circulated about the aperture. Multiple apertures can also be used to provide a variety of footprint sizes and/or shapes. This description is not intended to be a complete description of, or limit the scope of, the invention. Other features, aspects, and objects of the invention can be obtained from a review of the specification, the figures, and the claims.

45 Claims, 8 Drawing Sheets

SYSTEMS AND METHODS UTILIZING AN APERTURE WITH A REACTIVE ATOM PLASMA TORCH

CLAIM OF PRIORITY

This application claims priority to U.S. Provisional patent application No. 60/495,176, entitled "Systems and Methods Utilizing an Aperture with a Reactive Atom Plasma Torch," by Andrew Chang, et al., filed Aug. 14, 2003.

CROSS-REFERENCED CASES

The following patent and applications are cross-referenced and incorporated herein by reference:

U.S. Pat. No. 6,660,177, entitled "Apparatus and Method for Reactive Atom Plasma Processing for Material Deposition," by Jeffrey W. Carr, issued Dec. 9, 2003.

U.S. patent application Ser. No. 10/383,478, entitled "Apparatus and Method Using a Microwave Source for Reactive Atom Plasma," by Jeffrey W. Carr, filed Mar. 7, 2003.

U.S. patent application Ser. No. 10/384,506, entitled "Apparatus and Method for Non-Contact Cleaning of a Surface," by Jeffrey W. Carr, filed Mar. 7, 2003.

U.S. patent application Ser. No. 10/754,326, entitled "Apparatus for Non-Contact Cleaning of a Surface," by Jeffrey W. Carr, filed Jan. 9, 2004.

FIELD OF THE INVENTION

The field of the invention relates to the selective modification or removal of material from a surface.

BACKGROUND

Modern materials present a number of formidable challenges to the fabricators of a wide range of optical, semiconductor, and electronic components, many of which require precision shaping, smoothing, and polishing. The use of plasmas to etch materials has become an important technique in the optical component and semiconductor industries. Recent advances have introduced sub-aperture plasma processes, such as reactive atom processing (RAP), which act more like traditional machining tools by etching only specific areas of a workpiece.

A plasma etching process differs from its mechanical counterpart by the mechanism in which material is removed. Traditional machine tools use mechanical parts to physically cut away material from a workpiece. Plasma etching processes, on the other hand, rely upon chemical reactions to transform the solid material of the workpiece into a volatile or otherwise labile byproduct. Plasmas offer advantages such as the contact-free removal of material, in which little to no force is extered on the workpiece. Reliance upon a chemical means of material removal introduces a whole new set of factors to consider when treating a material.

A RAP torch can be used to determinalistically shape and polish surfaces using a plasma or a flame. The discharge emitted from the RAP torch can remove material for the surface of a workpiece, somewhat analogous to the end mill used in traditional machining. The footprint of a typical RAP torch tool is roughly Gaussian in shape, and has a size that can be determined by the inside diameter of the outer tube that contains and directs the plasma host gas or non-reactive species.

In traditional machining, a variety of tool shapes and sizes are required. For maximum utility, machine tools have been designed to allow rapid interchange of bits and cutters. This approach is also possible with a RAP tool, but the presence of induction coils tends to complicate the changeover. Before any shift occurs, the unit must cool down and the enclosure must be purged of any dangerous fumes. The gas lines to the torch must be disconnected to remove the torch assemby and then purged before a new unit is installed. Depending on the size and type of the new torch, it may be necessary to replace coils used to generate the inductively coupled plasma (ICP). Once the torch assembly and coils have been swapped, the entire setup must be meticulously realigned and tested in order to assure proper function.

DETAILED DESCRIPTION

Figure 2:
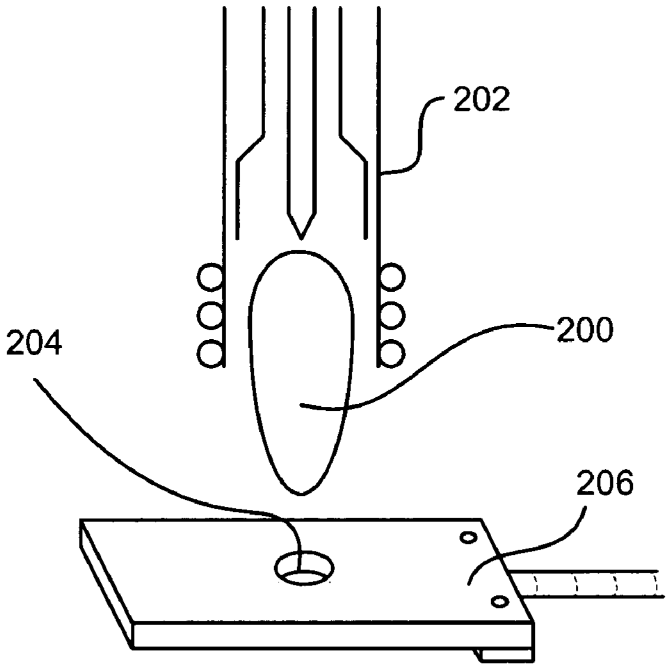
FIG. 2 is a diagram showing the shape and footprint of a plasma discharge from a RAP torch such as that shown in FIG. 1.
Figure 3:
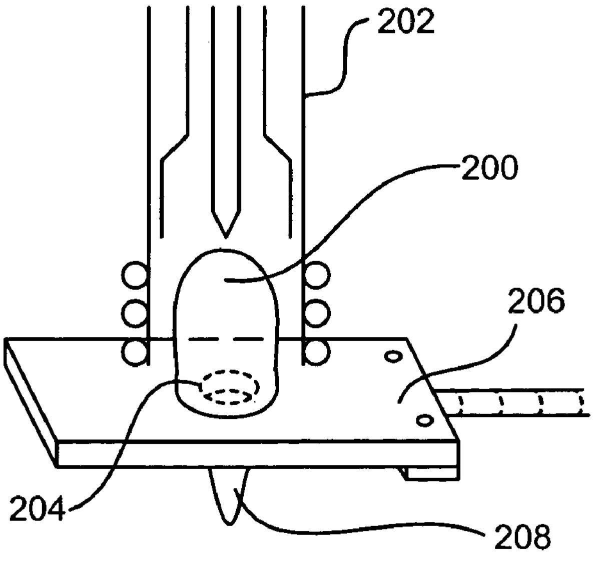
FIG. 3 is a diagram showing the shape and footprint of the plasma discharge of FIG. 2 while passing the discharge through an aperture in accordance with one embodiment of the present invention.

Systems and methods in accordance with embodiments of the present invention can utilize a footprint-modification device, such as a mechanical aperture, to control the size and/or shape of the active footprint of an atmospheric pressure reactive atom plasma (RAP) torch. For example, FIG. 2 shows the shape of a plasma discharge 200 from a RAP torch 202, without the discharge passing through an aperture 204 of an aperture device 206. FIG. 3 shows the same plasma discharge 200 being passed through the aperture 204. The portion 208 of the plasma passing through the aperture has a smaller effective diameter, measured horizontally in the Figure, resulting in a smaller active footprint. The aperture device can be any appropriate device, such as a high temperature metal or ceramic device having an opening that can allow passage of at least a portion of an impinging RAP plasma or RAP flame.

The size of the aperture can vary, and different apertures can be used with the same RAP torch to produce different footprints. The differing apertures can be in the same aperture device, necessitating only a shift or rotation in the aperture device relative to the RAP torch in order to switch apertures. The differing apertures can also be in separate aperture devices, requiring that the devices be switched out in order to change apertures. Alternatively, a number of torches can be used, with each torch having an aperture device with a differently-sized aperture. Any appropriate device can be used to position the aperture device(s), such as a pneumatic, solenoid or stepper motor driven actuator in combination with a control mechanism. Alternatively, variable-diameter apertures can be used. The use of a variable aperture can allow for "on-the-fly" adjustment of the torch footprint size and shape, as well as reduction of the heat load on the workpiece.

Figure 10:
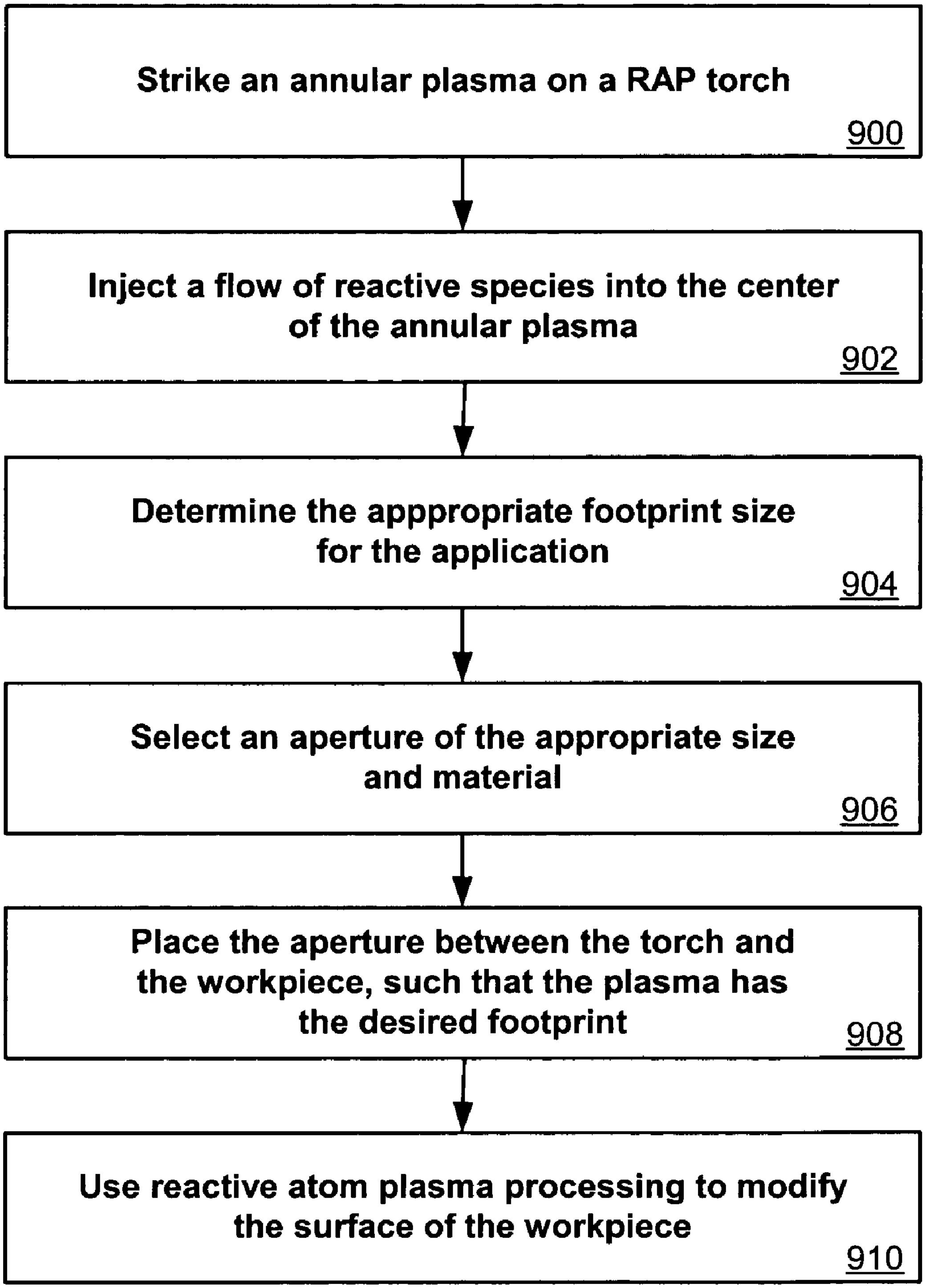
FIG. 10 is a flowchart showing a process that can be used with the system of FIG. 2.

An exemplary process that can take advantage of differently sized apertures is shown in the flowchart of FIG. 10. In the process, an annular plasma is struck on a RAP torch, 900. A flow of reactive species is injected into the center of the annular plasma 902, the reactive species being selected as being capable of chemically reacting with the surface material of the workpiece being processed. The appropriate footprint size to be used in processing the workpiece can be determined 904, such as by using a footprint calculation program or algorithm. An aperture of appropriate size can be selected, in an aperture device of an appropriate material 906. The material of the aperture device can be selected based on, for example, the heat capacity and reactive nature of the material. The aperture device can be positioned such that the aperture is between the plasma and the workpiece, with the aperture being positioned such that the impinging plasma has the appropriate footprint 908. The footprint can be determined, for example, at the point along the primary axis of the plasma (vertical in FIG. 1) at which the proper amount of heat will be applied to the workpiece, such that the torch can be moved an appropriate distance from the workpiece. Once the aperture and torch are in position relative to the workpiece, reactive atom plasma processing can be used to modify the surface of the workpiece 910, such as to etch, smooth, polish, clean, and/or deposit material onto the workpiece. The torch and/or workpiece can be moved relative to each other in order to process the necessary portion(s) of the workpiece. The movement can be any appropriate movement, such as along a predetermined path, along a raster or "fixed" pattern, or can be determined dynamically be measuring the surface to be modified.

Figure 4:
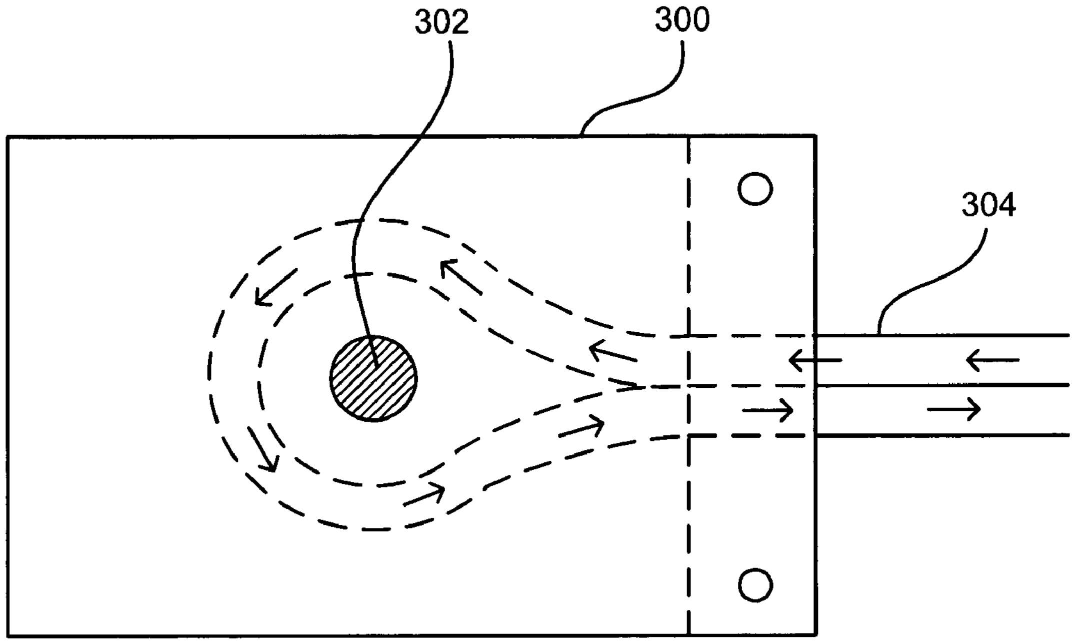
FIG. 4 is a top view of a liquid-cooled aperture device that can be used with the torch of FIG. 1.

The use of an aperture can help to circumvent inconveniences associated with replacing the torch, while enabling smaller tool footprints than previously obtainable. In order to prevent arcing to ground, an aperture device can be electrically isolated. The electric isolation can occur in one embodiment by suspending the aperture device from an insulating rod, such as a ceramic rod, having a high melting point. In order to withstand thermal shock as well as the high temperatures of the plasma, an aperture device can be constructed of an appropriate material, such as stainless steel, platinum, or a high-temperature ceramic. For extended exposure to the plasma, a temperature-reducing device such as an electrically-isolated water chiller can be used to liquid cool the aperture. Such a device is shown in FIG. 4. In the Figure, a channel 304 in the aperture device 300 allows a flow of liquid or gas to circulate about the aperture 302 in order to remove heat from the area about the aperture. If liquid is circulated through the channel 304, for example, the liquid can be cooled in order to further reduce or remove heat from the aperture device 300.

As a plasma flame impinges on an aperture device, the flame can be physically confined while passing through the aperture, depending upon the shape and size of the aperture compared to that portion of the flame passing through the aperture. In some embodiments, the only lower limit on the size of the resulting tool footprint is the size at which a hole or opening can be created, such as by drilling, in the chosen aperture material. A variety of different tool shapes can also be obtained through the use of differently shaped apertures. An aperture itself can take on a variety of shapes and sizes, such as multiple holes, non-circular openings, irregular shapes, and slits tailored to the specific application at hand.

Figure 5:
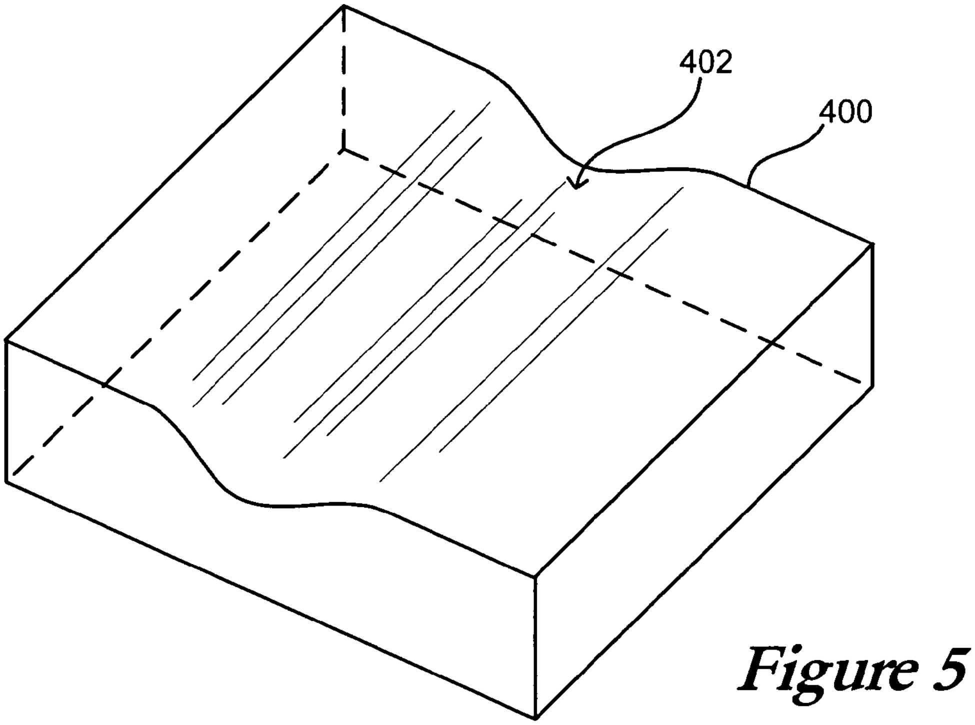
FIG. 5 is a perspective view of a trench that can be formed in a substrate using the torch of FIG. 2.
Figure 6:
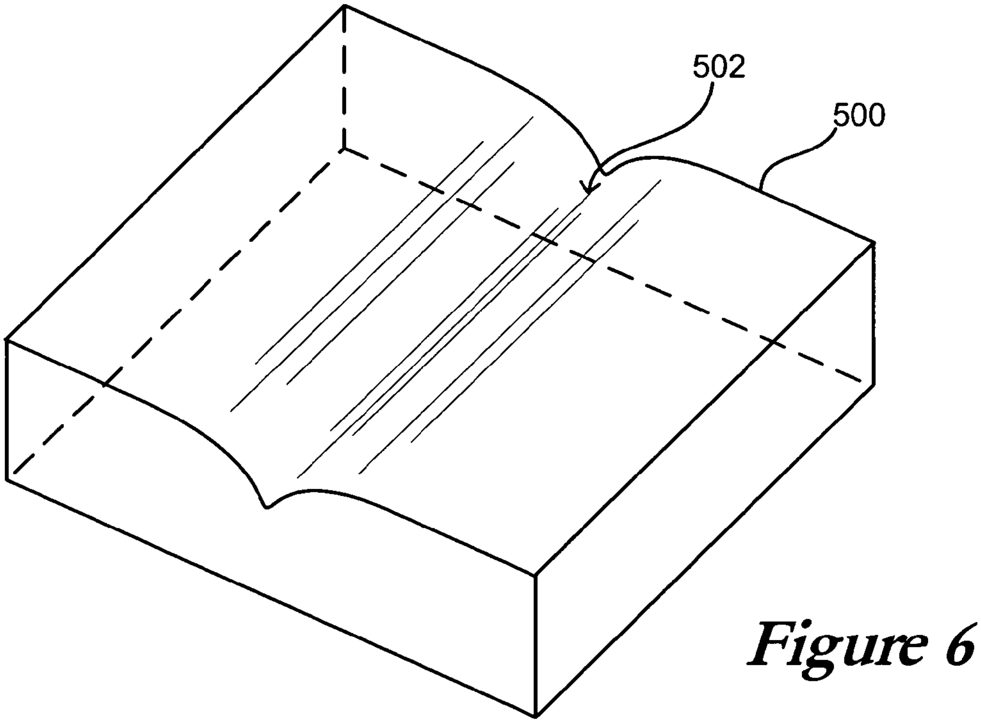
FIG. 6 is a perspective view of a trench that can be formed in a substrate by the torch and aperture combination of FIG. 3.

Plasma torches typically have Gaussian discharges, such that a trench formed in a workpiece using such a torch will have a Gaussian cross-section regardless of the size of the footprint. For example, FIG. 5 shows a trench 402 that could be formed in a workpiece 400 using a standard RAP torch such as that shown in FIG. 2. Using the same torch passed through an aperture, such as shown in FIG. 3, FIG. 6 shows another trench 502 that could be formed in a workpiece 500. The trenches in FIGS. 5 and 6 have different widths in cross-section, due to the use of an aperture in one instance, but still retain the basic Gaussian shape.

One potential drawback to using an ICP plasma torch is the possibility of applying too much heat to a workpiece. Excessive heating can introduce strain into many types of materials, and should be avoided where possible. An added benefit of using an aperture with such a system is the reduction of the overall heat flux into the work piece. An aperture can absorb some of the heat, and can also act to deflect some of the incident plasma/heat away from the workpiece. The ability of an aperture to deflect heat allows a RAP process to be applied to heat sensitive materials. Typically, the central part of a plasma can contain the highest concentration of reactive species, but a lower heat concentration. In the case of annular plasmas, the largest amount of heat can be in the outermost region of the discharge. For such a configuration, a centrally positioned aperture of the proper diameter can allow for a desirable combination of high etch rate and low heat load.

The need to fragment a non-reactive precursor for use as a reactive atom, for example, can cause a certain amount of energy to be supplied to the plasma, typically in the form of heat. In the region where material removal is greatest, the bulk of the heat can be contained in the outer sheath of argon gas. The use of an aperture effectively deflects a substantial portion of the gas and its concomitant energy away from the workpiece. With the correct range of aperture sizes, a suitable amount of argon remains to act as a protective sheath, blanketing the part and keeping the native atmosphere from the reactive species. The separation of these two zones improves the process by limiting the amount of reactive species lost through recombination and by reducing the post-process interaction of the reaction products with the residual gas in the work chamber.

An aperture should typically be constructed of a material that is capable of handling the high temperatures generated by the plasma or flame with which the aperture is to be used. Simple apertures in materials such as stainless steel, platinum, and ceramics can be sufficient for short exposure times. For longer exposure times, it can be necessary to apply active cooling to material surrounding the aperture. As discussed above, liquid cooling can be used wherein channels are fashioned in the material surrounding the aperture in order to allow rapid flow of water or another desired coolant.

Figure 7:
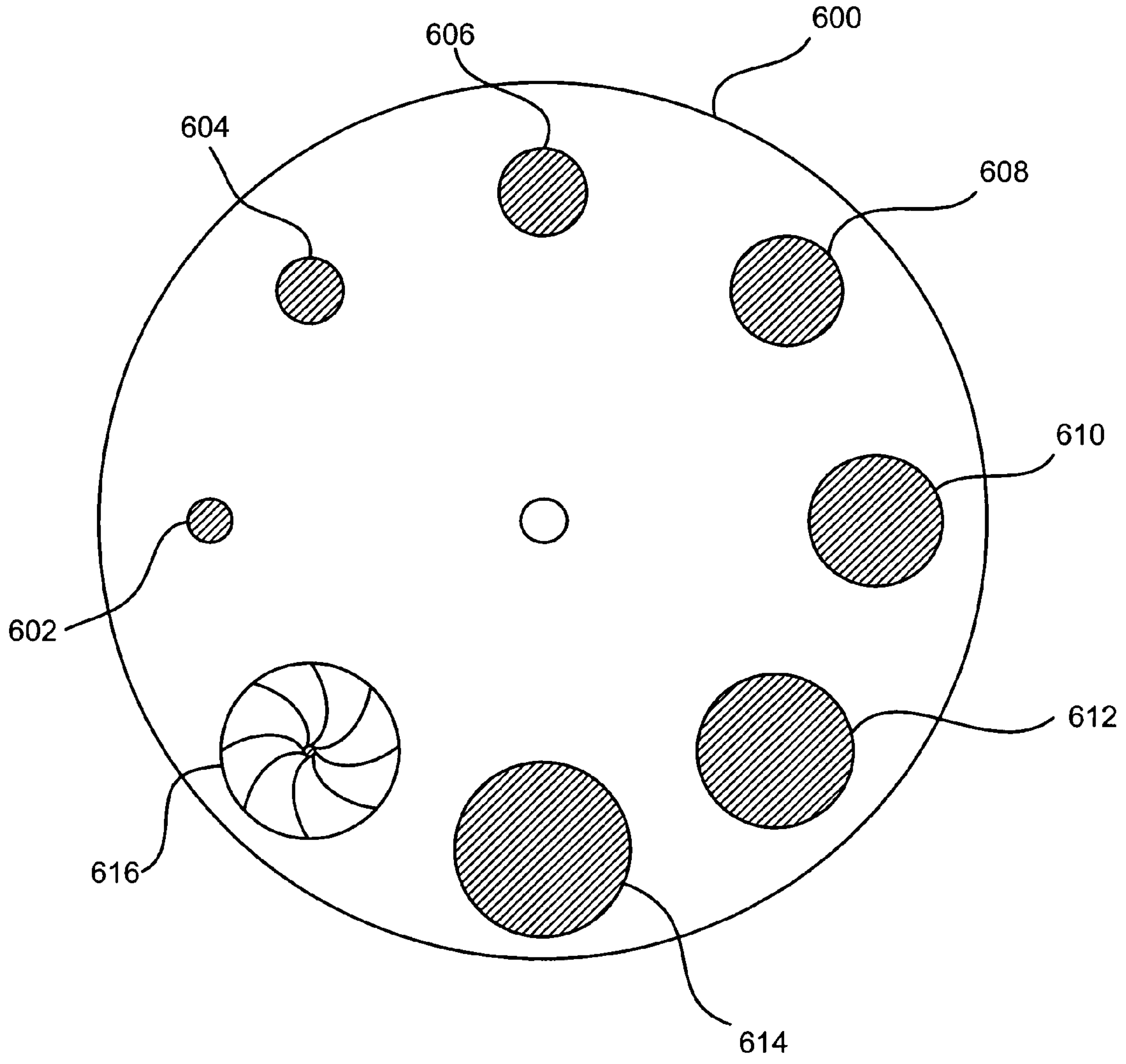
FIG. 7 is a top view showing a multi-aperture device that can be used with the torch of FIG. 1.

Another embodiment in accordance with the invention utilizes a configuration in which several apertures are situated in a circular arrangement on a rotary turret, such as that shown in FIG. 7. In the Figure, seven apertures 602, 604, 606, 608, 610, 612, and 614 are included in the rotary turret, with each fixed aperture having a different diameter. A variable aperture 616 is also shown in the turret 600. The variable aperture can be sized such that the effective diameter of the aperture varies from a completely closed configuration to a completely open configuration that allows the plasma to pass without contacting the aperture. Having a completely closed configuration provides a position on the turret where no heat or plasma will be applied to the workpiece. Having a completely open configuration allows the full footprint of the plasma to be applied to a workpiece. The variable aperture can be of any appropriate design known to vary the size of an aperture, such as those used in camera applications. The turret itself can be made of any appropriate material, such as those mentioned above with respect to aperture devices. Such a turret allows individual apertures to be rotated into the plasma flame and quickly replaced. While apertures of different sizes allow for rapid changing of the tool footprint size, the use of identical apertures on a turret can circumvent problems arising from excessive heating of a single aperture. Active cooling of each aperture, such as that described with respect to FIG. 4, can be utilized to further lengthen the service time of a single aperture in a multiple aperture system. Plasma temperatures are relatively high, but the heat capacity is not necessarily high, such that a number of materials can be used without a problem of sputter.

RAP Processing

RAP processes that can be used in accordance with embodiments of the present invention include those described in pending U.S. patent application Ser. Nos. 10/008,236, 10/383,478, and 10/384,506, which are incorporated herein by reference above.

Figure 1:
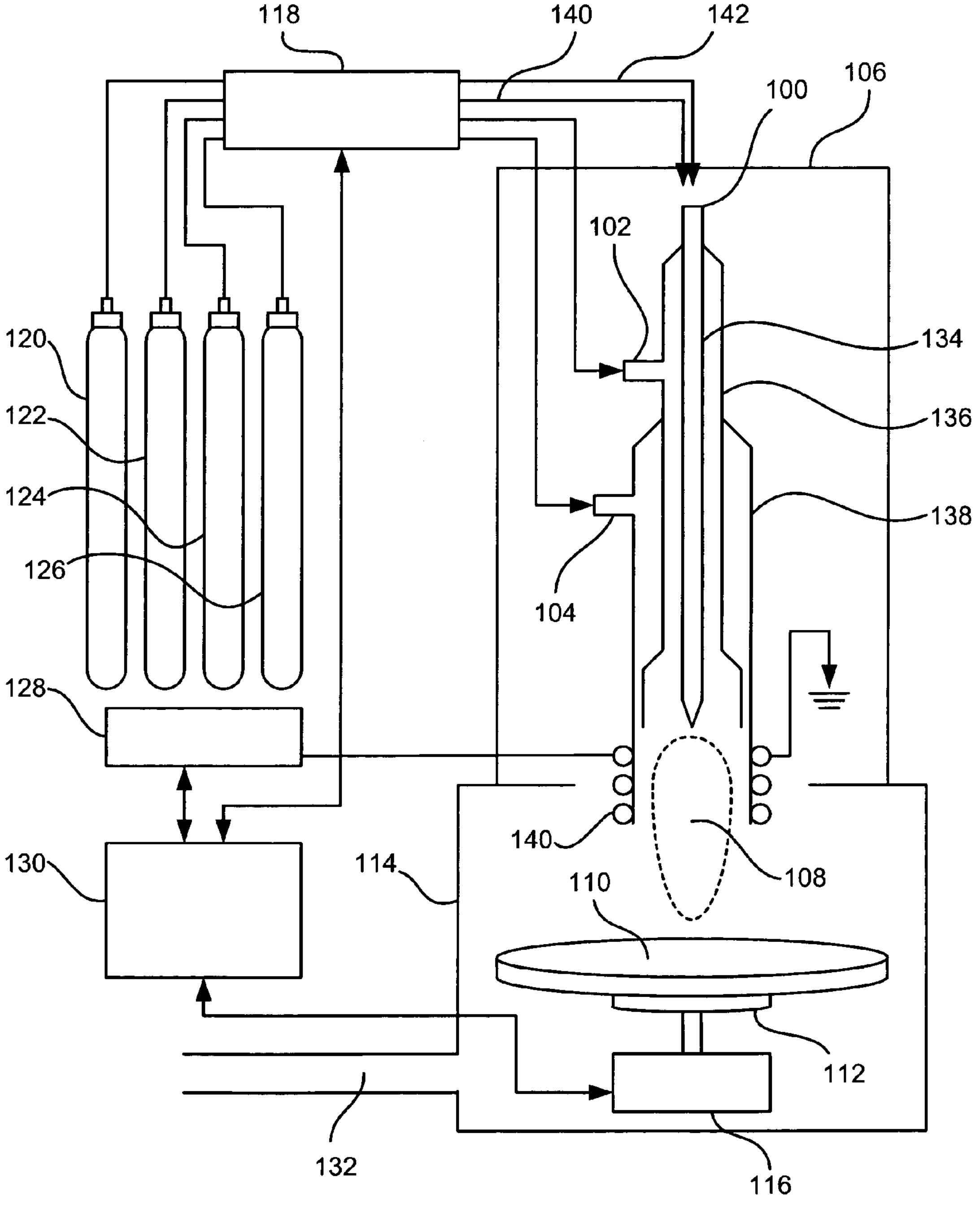
FIG. 1 is a diagram of an ICP RAP torch system that can be used in accordance with one embodiment of the present invention.

FIG. 1 shows a reactive atom plasma (RAP) system that can be used in accordance with embodiments of the present invention. FIG. 1 shows a plasma torch in a plasma box 106. The torch consists of an inner tube 134, an outer tube 138, and an intermediate tube 136. The inner tube 134 has a gas inlet 100 for receiving a stream of reactive precursor gas 142 from a mass flow controller 118. The torch can utilize different precursor gases during different processing steps. For instance, the torch might utilize a precursor adapted to clean a particular contaminant off a surface in a first step, while utilizing a precursor for redistributing material on the surface of the workpiece during a second step.

The intermediate tube 136 has a gas inlet 102 that can be used to, for example, receive an auxiliary gas from the flow controller 118. The outer tube 138 has a gas inlet 104 that can be used to receive plasma gas from the mass flow controller 118. The mass flow controller 118 can receive the necessary gases from a number of gas supplies 120, 122, 124, 126, and can control the amount and rate of gases passed to the respective tube of the torch. The torch assembly can generate and sustain plasma discharge 108, which can be used to clean then shape or polish a workpiece 110 located on a chuck 112, which can be located in a workpiece box 114. A workpiece box 114 can have an exhaust 132 for carrying away any process gases or products resulting from, for example, the interaction of the plasma discharge 108 and the workpiece 110.

The chuck 112 in this embodiment is in communication with a translation stage 116, which is adapted to translate and/or rotate a workpiece 110 on the chuck 112 with respect to the plasma discharge 108. The translation stage 116 is in communication with a computer control system 130, such as may be programmed to provide the necessary information or control to the translation stage 116 to allow the workpiece 110 to be moved along a proper path to achieve a desired cleaning, shaping, and/or polishing of the workpiece. The computer control system 130 is in communication with an RF power supply 128, which supplies power to the torch. The computer control system 130 also provides the necessary information to the mass flow controller 118. An induction coil 140 surrounds the outer tube 138 of the torch near the plasma discharge 108. Current from the RF power supply 128 flows through the coil 140 around the end of the torch. This energy is coupled into the plasma.

Other RAP Systems

Another RAP system that can be used in accordance with embodiments of the present invention can utilize a simple flame, such as a hydrogen-oxygen ($H_2/O_2$) flame that is adjusted to burn with an excess of oxygen. A device using such a simple flame can be cheaper, easier to develop and maintain, and significantly more flexible than an ICP device. Existing $H_2/O_2$ torches are principally used for quartz glass blowing and by jewelers for melting platinum. Such torches can also have significantly smaller footprints than ICP devices.

A flame torch 700 can be designed in several ways. In the relatively simple exemplary design of FIG. 8(*a*), a reactive precursor gas can be mixed with either the fuel or the oxidizer gas before being injected into the torch through the fuel input 702 or the oxidizer input 704. Using this approach, a standard torch could be used to inject the precursor into the flame 706. Depending on the reactive precursor, the torch head might have to be made with specific materials. For example, mixing chlorine or chlorine-containing molecules into an $H_2/O_2$ torch can produce reactive chlorine radicals.

Figure 8A:
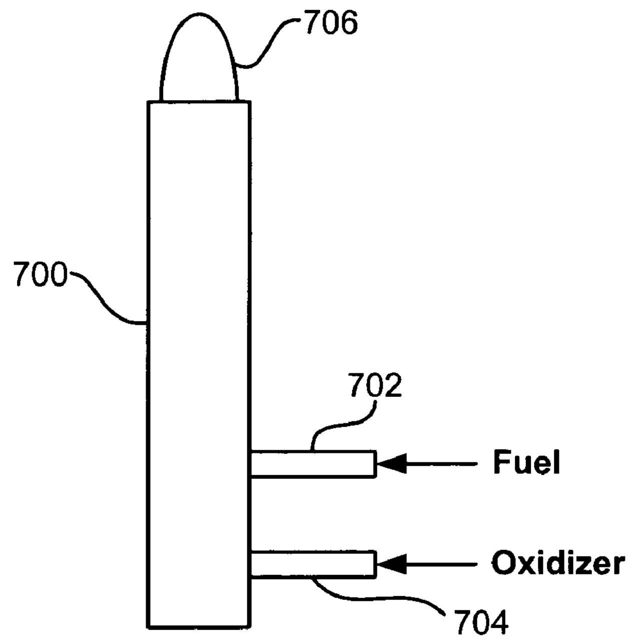
FIGS. 8(*a*) and 8(*b*) are diagrams of a plasma torch that can be used in place of the ICP RAP torch of FIG. 1.
Figure 8B:
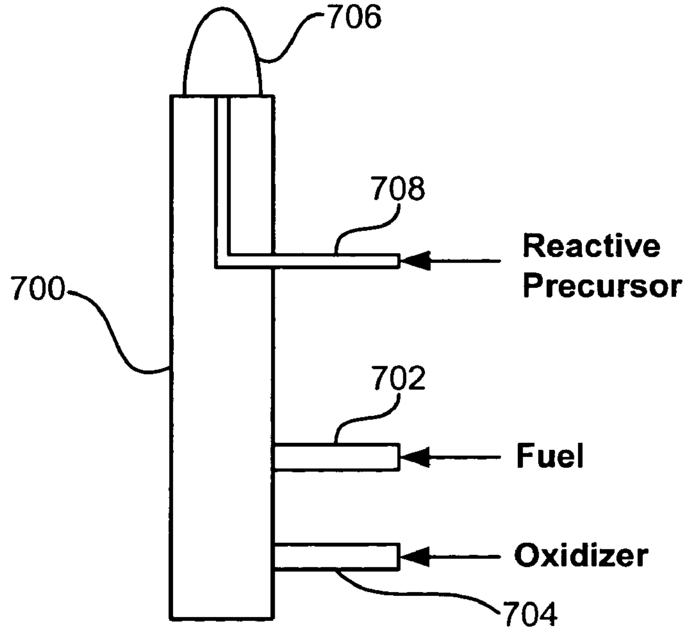

The slightly more complex exemplary design of FIG. 8(*b*) can introduce the reactive precursor gas into the flame 706 using a small tube 708 in the center of the torch 700 orifice. The flame 706 in this case is usually chemically balanced and is neither a reducing nor oxidizing flame. In this design a variety of gases, liquids, or solids can be introduced coaxially into the flame to produce reactive components. The torch in this embodiment can produce, for example, O, Cl, and F radicals from solid, liquid, and gaseous precursors.

In any of the above cases, a stream of hot, reactive species can be produced that can chemically combine with the surface of a part or workpiece. When the reactive atoms combine with the contaminants, a gas is produced that can leave the surface.

A RAP system can operate over a wide range of pressures. Its most useful implementation can involve operation at or near atmospheric pressure, facilitating the treatment of large workpieces that cannot easily be placed in a vacuum chamber. The ability to work without a vacuum chamber can greatly increase throughput and reduce the cost of the tool that embodies the process.

The flame system can easily be used with a multi-nozzle burner or multi-head torch to quickly cover large areas of the surface. For other applications, a small flame can be produced that affects an area on the surface as small as about 0.2 mm full width-half maximum (FWHM) for a Gaussian- or nearly Gaussian-shaped tool. Another advantage of the flame system is that it does not require an expensive RF power generator nor shielding from RF radiation. In fact, it can be a hand-held device, provided that adequate exhaust handing equipment and user safety devices are utilized. Further, a flame torch is not limited to a $H_2$—$O_2$ flame torch. Any flame torch that is capable of accepting a source of reactive species, and fragmenting the reactive species into atomic radicals that can react with the surface, can be appropriate.

Figure 9:
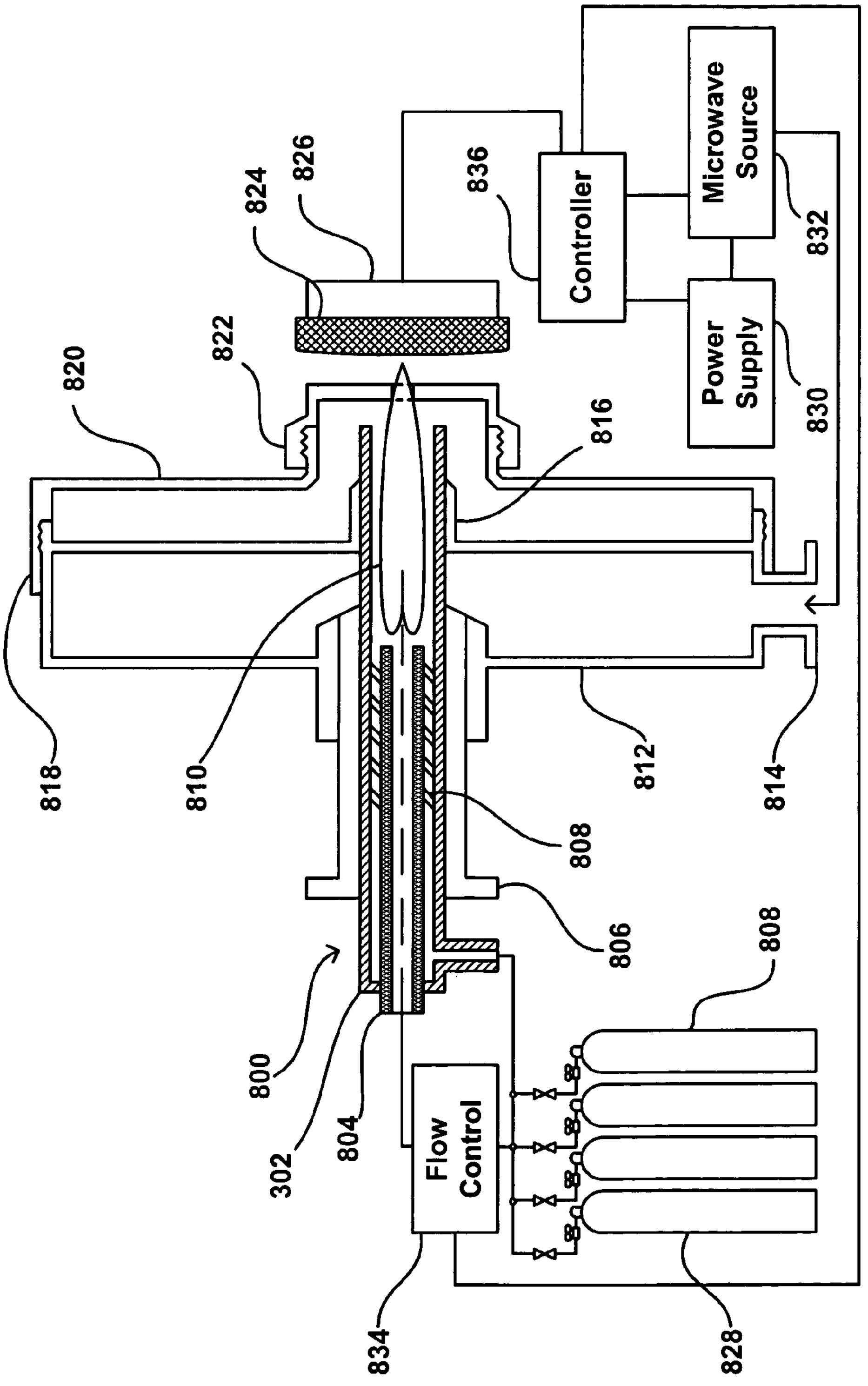
FIG. 9 is a diagram of an MIP torch system that can be used in accordance with another embodiment of the present invention.

As shown in FIG. 9, another RAP system that can be used in accordance with the present invention utilizes a microwave-induced plasma (MIP) source. A MIP source has proven to have a number of attributes that complement, or even surpass in some applications, the use of an ICP tool or a flame as an atomization source. The plasma can be contained in a quartz torch 800, which is distinguished from a standard ICP by the use of two concentric tubes instead of three. With a large enough bore, a torroidal plasma can be generated and the precursor injected into the center of the torch in a manner analogous to the ICP.

A helical insert 808 can be placed between the outer tube 802 and the inner tube 804 of the torch 800 to control tube concentricity, as well as to increase the tangential velocity of gas. The vortex flow can help stabilize the system, and the high velocity can aid in cooling the quartz tubes 802, 804.

The main portion of the microwave cavity 812 can be any appropriate shape, such as a circular or cylindrical chamber, and can be machined from a highly conductive material, such as copper. The energy from a 2.45 GHz (or other appropriate) power supply 830 can be coupled into the cavity 812 through a connector 814 on one edge of the cavity. The cavity 812 can be tuned in one embodiment by moving a hollow cylindrical plunger 806, or tuning device, into or out of the cavity 812. The quartz torch 800 is contained in the center of the tuning device 806 but does not move while the system is being tuned.

An external gas sheath 820 can be used to shield the plasma 820 from the atmosphere. The sheath 820 confines and can contribute to the longevity of the reactive species in the plasma, and can keep the atmospheric recombination products as low as practically possible. In one embodiment, the end of the sheath 820 is approximately coplanar with the open end, or tip, of the torch 800. The sheath 820 can be extended beyond the tip of the torch 800 by installing an extension tube 822 using a threaded flange at the outlet of the sheath 820. The sheath itself can be threadably attached 818 to the main cavity 812, which can allow a fine adjustment on height to be made by screwing the sheath either toward or away from the cavity 812. Alternatively, the sheath 820 or the extension tube 822 can include an aperture in order to control the tool footprint. Apertures could then be changed simply by replacing the extension tube or sheath with an extension tube or sheath having a different size aperture, for example.

A supply of process gas 828 can provide process gas to both tubes 802, 804 of the torch 800. In one embodiment this process gas is primarily composed of argon or helium, but can also include carbon dioxide, oxygen or nitrogen, as well as other gases, if the chemistry of the situation permits. Gas flows in this embodiment can be between about one and about ten liters per minute. Again, the gases introduced to the torch can vary on the application. Reactive precursor gas(es) can be introduced to clean a surface, followed by a different precursor gas(es) to shape or otherwise modify the surface of the workpiece. This allows a workpiece to be cleaned and processed in a single chamber without a need to transfer the workpiece to different devices to accomplish each objective.

Chemistry

A reactive atom plasma process in accordance with embodiments of the present invention is based, at least in part, on the reactive chemistry of atomic radicals and reactive fragments formed by the interaction of a non-reactive precursor chemical with a plasma. In one such process, the atomic radicals formed by the decomposition of a non-reactive precursor interact with material of the surface of the part being modified. The surface material is transformed to a gaseous reaction product and leaves the surface. A variety of materials can be processed using different chemical precursors and different plasma compositions. The products of the surface reaction in this process must be a gas under the conditions of the plasma exposure. If not, a surface reaction residue can build up on the surface which will impede further etching.

In the above examples, the reactive precursor chemical can be introduced as a gas. Such a reactive precursor could also be introduced to the plasma in either liquid or solid form. Liquids can be aspirated into the plasma and fine powders can be nebulized by mixing with a gas before introduction to the plasma. RAP processing can be used at atmospheric pressure. RAP can be used as a sub-aperture tool to precisely clean and shape surfaces.

A standard, commercially-available two- or three-tube torch can be used. The outer tube can handle the bulk of the plasma gas, while the inner tube can be used to inject the reactive precursor. Energy can be coupled into the discharge in an annular region inside the torch. As a result of this coupling zone and the ensuing temperature gradient, a simple way to introduce the reactive gas, or a material to be deposited, is through the center. The reactive gas can also be mixed directly with the plasma gas, although the quartz tube can erode under this configuration and the system loses the benefit of the inert outer gas sheath.

Injecting the reactive precursor into the center of the excitation zone has several important advantages over other techniques. Some atmospheric plasma jet systems, such as ADP, mix the precursor gas in with the plasma gas, creating a uniform plume of reactive species. This exposes the electrodes or plasma tubes to the reactive species, leading to erosion and contamination of the plasma. In some configurations of PACE, the reactive precursor is introduced around the edge of the excitation zone, which also leads to direct exposure of the electrodes and plasma contamination. In contrast, the reactive species in the RAP system are enveloped by a sheath of argon, which not only reduces the plasma torch erosion but also reduces interactions between the reactive species and the atmosphere.

The inner diameter of the outer tube can be used to control the size of the discharge. On a standard torch, this can be on the order of about 18 to about 24 mm. The size can be somewhat frequency-dependent, with larger sizes being required by lower frequencies. In an attempt to shrink such a system, torches of a two tube design can be constructed that have an inner diameter of, for example, about 14 mm. Smaller inner diameters may be used with microwave excitation, or higher frequency, sources.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for modifying the footprint of a reactive atom plasma torch, comprising:

injecting a reactive precursor into the center of an annular plasma;
determining a modified footprint;
selecting an aperture based on the modified footprint;
determining a target distance of the aperture from one or both of the reactive atom plasma torch and a surface of the workpiece based on the modified footprint; and
positioning the aperture at the target distance so that the plasma impinges on the aperture, the aperture reducing the size of a portion of the plasma passing through the aperture to a fraction of the size of a surface of a workpiece and directing the portion of the plasma to a fraction of the surface of the workpiece.

2. A method according to claim 1, further comprising: bringing the plasma into proximity with the surface of a workpiece.

3. A method according to claim 1, further comprising:
using the portion of the plasma passing through the aperture to modify the surface of the workpiece, the surface of the workpiece containing a material that can chemically combine with a reactive species generated from the reactive precursor and leave the surface of the workpiece.

4. A method according to claim 1, wherein:
the aperture alters the shape of the portion of the plasma passing through the aperture.

5. A method according to claim 1, further comprising: striking the plasma.

6. A method according to claim 1, further comprising: maintaining the plasma at about atmospheric pressure.

7. A method according to claim 1, further comprising: selecting an aperture device having an aperture of a desired size.

8. A method according to claim 1, wherein: the aperture device is capable of shielding heat from a workpiece.

9. A method according to claim 7, wherein:
the aperture device is constructed from a material selected from the group consisting of high temperature metals and high temperature ceramics.

10. A method according to claim 1, wherein: the aperture is a variable-diameter aperture.

11. A method according to claim 1, wherein: the aperture device is electrically isolated.

12. A method according to claim 1, further comprising: using a temperature-reducing device to reduce the temperature of the aperture.

13. A method according to claim 12, wherein:
the temperature-reducing device includes an electrically-isolated water chiller capable of circulating cooled liquid about the aperture.

14. A method according to claim 1, further comprising: selecting the aperture from a plurality of differently-sized apertures.

15. A method according to claim 1, wherein:
the aperture is selected from the group consisting of single holes, single slits, multiple holes, non-circular openings, irregular shapes, and regular shapes.

16. A method according to claim 1, further comprising:
using the aperture to direct heat away from a workpiece.

17. A method according to claim 1, further comprising:
selecting the aperture from a plurality of differently-shaped apertures positioned about a rotary turret.

18. A method according to claim 1, further comprising:
using a reactive atom plasma torch to generate the plasma.

19. A method according to claim 18, wherein:
the torch is selected from the group consisting of ICP torches, MIP torches, and flame torches.

20. A method for modifying the active footprint of a reactive atom plasma torch, comprising:
using a plasma torch to inject a reactive precursor into the center of an annular plasma;
determining a modified footprint;
selecting an aperture based on the modified footprint;
determining a target distance of the aperture from one or both of the reactive atom plasma torch and a surface of the workpiece based on the modified footprint; and
positioning the aperture at the target distance so that a portion of the plasma passes through the aperture and is reduced to a fraction of the size of a surface of a workpiece;
bringing the plasma into proximity with the surface of the workpiece; and
using the portion of the plasma passing through the aperture to modify a fraction of the surface of the workpiece.

21. A method according to claim 20, further comprising:
producing a stream of atomic radicals from said reactive precursor.

22. A method according to claim 20, further comprising:
supplying a source of fuel to the plasma torch.

23. A method according to claim 20, further comprising:
using reactive plasma processing to shape the surface of the workpiece.

24. A method according to claim 20, further comprising:
rotating the workpiece with respect to the plasma torch.

25. A method according to claim 20, further comprising:
selecting a concentration of reactive species to be introduced into the plasma torch.

26. A method according to claim 20, further comprising:
operating the plasma torch at about atmospheric pressure.

27. A method according to claim 20, further comprising:
polishing the surface of the workpiece with the plasma torch.

28. A method according to claim 20, further comprising:
planarizing the surface of the workpiece with the plasma torch.

29. A method according to claim 20, further comprising:
using a plasma torch with multiple heads, and an aperture for each head, to increase the rate of surface modification.

30. A method for modifying the active footprint of a reactive atom plasma, comprising:
determining a modified footprint;
selecting an aperture based on the modified footprint;
determining a target distance of the aperture from one or both of the reactive atom plasma torch and a surface of the workpiece based on the modified footprint; and
positioning the aperture at the target distance so that only a portion of the reactive atom plasma passes through the aperture and is reduced to a fraction of the size of a surface of a workpiece and is pointed to a fraction of the surface of the workpiece.

31. A method according to claim 30, further comprising:
using the plasma to clean the surface of the workpiece.

32. An aperture device for changing the shape of the tool footprint of an atmospheric pressure plasma torch, comprising:
a rigid part capable of withstanding the heat from a plasma impinging on the part; and
an aperture positioned in the part, the aperture capable of deflecting a first portion of a plasma impinging on the rigid part so as to allow a second portion of the plasma to pass through the aperture and be reduced to a fraction of the size of a surface of a workpiece, wherein a distance of the rigid part from one or both of the atmospheric pressure plasma torch and the surface of the workpiece is adjustable so that the second portion has a footprint of a desired shape and a desired temperature profile.

33. An aperture device according to claim 32, wherein:

the rigid part is made of a material selected from the group consisting of high-temperature metals and high-temperature ceramics.

34. An aperture device according to claim 32, further comprising:

an insulated rod capable of supporting the aperture device in order to electrically isolate the aperture device.

35. An aperture device according to claim 32, further comprising:

a temperature-reducing device capable of reducing the temperature of the aperture.

36. An aperture device according to claim 35, wherein: the temperature-reducing device includes an electrically-isolated water chiller capable of circulating cooled liquid about the aperture.

37. An aperture device according to claim 35, further comprising:

at least one channel positioned about the aperture in the aperture device, the channel capable of carrying at least one of a liquid and a gas capable of removing heat from the aperture device.

38. An aperture device according to claim 32, further comprising:

a translation device adapted to position the aperture device relative to the plasma.

39. An aperture device according to claim 32, further comprising:

a switching device capable of positioning additional apertures relative to the plasma.

40. An aperture device for changing the shape of the tool footprint of an atmospheric pressure plasma torch, comprising:

a rigid part capable of withstanding the heat from a plasma impinging on the part;

a plurality of apertures positioned about the part, each aperture having a different shape and being capable of deflecting a first portion of a plasma impinging on the rigid part so as to allow a second portion of the plasma to pass through the aperture and be reduced to a fraction of the size of a surface of a workpiece, wherein a distance of the rigid part to one or both of the surface of the workpiece and the atomic pressure plasma torch is adjustable so that the second portion has a footprint of a desired shape and a desired temperature profile; and a rotation device capable of moving individual apertures into and out of a reactive atom plasma flame.

41. An aperture device according to claim 40, wherein:

the rigid part is a rotary turret.

42. An aperture device according to claim 40, wherein:

the rigid part is electronically isolated from ground.

43. An aperture device according to claim 40, further comprising:

a temperature-reducing device capable of reducing the temperature of each of the plurality of apertures.

44. An aperture device according to claim 40, further comprising:

an actuator capable of rotating the rigid part.

45. An aperture tool for modifying the active footprint of a reactive atom plasma torch, the tool being able to accomplish the following steps:

deflect a first portion of a plasma impinging on the aperture; and allow a second portion of the plasma to pass through the aperture and be reduced to a fraction of the size of a surface of a workpiece, adjust a distance of the aperture from one or both of the reactive atom plasma torch and the surface of the workpiece so that the second portion has a footprint of a desired shape and a desired temperature profile.

* * * * *